(12) United States Patent
Smith et al.

(10) Patent No.: US 8,888,079 B2
(45) Date of Patent: Nov. 18, 2014

(54) APPARATUS FOR IMPROVED VIBRATION ISOLATION

(75) Inventors: Michael R. Smith, Colleyville, TX (US); Frank B. Stamps, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 121 days.

(21) Appl. No.: 13/511,821

(22) PCT Filed: Dec. 1, 2009

(86) PCT No.: PCT/US2009/066263
§ 371 (c)(1),
(2), (4) Date: May 24, 2012

(87) PCT Pub. No.: WO2011/068501
PCT Pub. Date: Jun. 9, 2011

(65) Prior Publication Data
US 2012/0279816 A1    Nov. 8, 2012

(51) Int. Cl.
   *F16F 5/00*     (2006.01)
   *F16F 13/24*    (2006.01)
   *F16F 13/18*    (2006.01)
   *F16F 13/08*    (2006.01)

(52) U.S. Cl.
   CPC ............ *F16F 13/08* (2013.01); *F16F 13/24* (2013.01); *F16F 13/18* (2013.01)
   USPC ....... 267/140.11; 267/136; 267/293; 188/314

(58) Field of Classification Search
   CPC ........... F16F 13/08; F16F 13/24; F16F 13/18; F16F 13/105; F16F 9/065

USPC ............. 188/269, 283, 315, 314, 322.21; 267/140.11, 136, 140.13, 293, 141.3; 248/562, 636, 638; 92/79; 137/171, 137/206
   See application file for complete search history.

(56) References Cited

U.S. PATENT DOCUMENTS

| 4,236,607 A | 12/1980 | Halwes et al. |
| 4,784,378 A * | 11/1988 | Ford ............................ 267/219 |

(Continued)

FOREIGN PATENT DOCUMENTS

| CN | 2838644 Y | 11/2006 |
| CN | 101198805 A | 6/2008 |

(Continued)

OTHER PUBLICATIONS

Extended European Search Report in related European patent application No. 09851927, mailed Mar. 8, 2013, 5 pages.

(Continued)

Primary Examiner — Thomas Irvin
(74) Attorney, Agent, or Firm — James E. Walton; Brian E. Harris

(57) ABSTRACT

A vibration isolator having an upper housing defining an upper fluid chamber, a lower housing defining a lower fluid chamber, a piston resiliently disposed within the upper housing and the lower housing, a tuning passage defined by the piston, for providing fluid communication between the upper fluid chamber and the lower fluid chamber, a tuning fluid disposed within the tuning passage, the upper fluid chamber, and the lower fluid chamber. A reservoir in fluid communication with the upper fluid chamber for providing pressurization control of the vibration isolator. An expanded accumulator region for providing Increased pressure retention during maintenance and operation of the vibration isolator.

18 Claims, 3 Drawing Sheets

(56) References Cited

U.S. PATENT DOCUMENTS

| | | | | |
|---|---|---|---|---|
| 5,788,029 | A | * | 8/1998 | Smith et al. .................... 188/267 |
| 5,803,213 | A | | 9/1998 | Davis et al. |
| 5,947,457 | A | * | 9/1999 | Swanson et al. ......... 267/140.14 |
| 5,957,440 | A | * | 9/1999 | Jones et al. .............. 267/140.14 |
| 6,009,983 | A | * | 1/2000 | Stamps et al. ................ 188/298 |
| 6,032,936 | A | | 3/2000 | Redinger |
| 6,131,709 | A | * | 10/2000 | Jolly et al. ................. 188/267.2 |
| 6,217,011 | B1 | * | 4/2001 | Redinger ................ 267/140.11 |
| 6,340,153 | B1 | | 1/2002 | Miesner |
| 6,431,530 | B1 | * | 8/2002 | Stamps et al. ................ 267/136 |
| 6,695,106 | B2 | * | 2/2004 | Smith et al. ................... 188/378 |
| 7,308,976 | B2 | * | 12/2007 | Turner ....................... 188/282.8 |
| 8,499,907 | B2 | * | 8/2013 | Smith et al. ................... 188/378 |
| 8,602,400 | B2 | * | 12/2013 | Ward et al. .................... 267/136 |
| 2006/0261530 | A1 | * | 11/2006 | Stamps et al. ........... 267/140.11 |

FOREIGN PATENT DOCUMENTS

| | | | |
|---|---|---|---|
| WO | 9906733 | A1 | 2/1999 |
| WO | 9927273 | A2 | 6/1999 |
| WO | 0190597 | A1 | 11/2001 |
| WO | 2006124112 | A1 | 11/2006 |

OTHER PUBLICATIONS

International Search Report and the Written Opinion of the International Searching Authority mailed by ISA/USA, U.S. Patent and Trademark Office on Jan. 28, 2010 for International Patent Application No. PCT/US09/66263, 8 pages.

Canadian Office Action in related Canadian patent application No. 2,780,953, 3 pages, Dec. 17, 2013.

Chinese Office Action in related Chinese patent application No. 200980162646.7, 6 pages, Nov. 15, 2013.

* cited by examiner

APPARATUS FOR IMPROVED VIBRATION ISOLATION

TECHNICAL FIELD

The present application relates in general to active vibration control. More specifically, the present application relates to an apparatus for isolating mechanical vibrations in structures or bodies that are subject to harmonic or oscillating displacements or forces. The present application is well suited for use in the field of aircraft, in particular, helicopters and other rotary wing aircraft.

DESCRIPTION OF THE PRIOR ART

For many years, effort has been directed toward the design of apparatus for isolating a vibrating body from transmitting its vibrations to another body. Such apparatuses are useful in a variety of technical fields in which it is desirable to isolate the vibration of an oscillating or vibrating device, such as an engine, from the remainder of the structure. Typical vibration isolation and attenuation devices ("isolators") employ various combinations of the mechanical system elements (springs and mass) to adjust the frequency response characteristics of the overall system to achieve acceptable levels of vibration in the structures of interest in the system. One field in which these isolators find a great deal of use is in aircraft, wherein vibration-isolation systems are utilized to isolate the fuselage or other portions of an aircraft from mechanical vibrations, such as harmonic vibrations, which are associated with the propulsion system, and which arise from the engine, transmission, and propellers or rotors of the aircraft.

Vibration isolators are distinguishable from damping devices in the prior art that are erroneously referred to as "isolators." A simple force equation for vibration is set forth as follows:

$$F = m\ddot{x} + c\dot{x} + kx$$

A vibration isolator utilizes inertial forces ($m\ddot{x}$) to cancel elastic forces ($kx$). On the other hand, a damping device is concerned with utilizing dissipative effects ($c\dot{x}$) to remove energy from a vibrating system.

One important engineering objective during the design of an aircraft vibration-isolation system is to minimize the length, weight, and overall size including cross-section of the isolation device. This is a primary objective of all engineering efforts relating to aircraft. It is especially important in the design and manufacture of helicopters and other rotary wing aircraft, such as tilt rotor aircraft, which are required to hover against the dead weight of the craft, and which are, thus, somewhat constrained in their payload in comparison with fixed-wing aircraft.

Another important engineering objective during the design of vibration-isolation systems is the conservation of the engineering resources that have been expended in the design of other aspects of the aircraft or in the vibration-isolation system. In other words, it is an important industry objective to make incremental improvements in the performance of vibration isolation systems which do not require radical re-engineering or complete redesign of all of the components which are present in the existing vibration-isolation systems.

A marked departure in the field of vibration isolation, particularly as applied to aircraft and helicopters is disclosed in commonly assigned U.S. Pat. No. 4,236,607, titled "Vibration Suppression System," issued 2 Dec. 1980, to Halwes, et al. (Halwes '607). Halwes '607 is incorporated herein by reference. Halwes '607 discloses a vibration isolator, in which a dense, low-viscosity fluid is used as the "tuning" mass to counterbalance, or cancel, oscillating forces transmitted through the isolator. This isolator employs the principle that the acceleration of an oscillating mass is 180° out of phase with its displacement.

In Halwes '607, it was recognized that the inertial characteristics of a dense, low-viscosity fluid, combined with a hydraulic advantage resulting from a piston arrangement, could harness the out-of-phase acceleration to generate counter-balancing forces to attenuate or cancel vibration. Halwes '607 provided a much more compact, reliable, and efficient isolator than was provided in the prior art. The original dense, low-viscosity fluid contemplated by Halwes '607 was mercury, which is toxic and highly corrosive.

Since Halwes' early invention, much of the effort in this area has been directed toward replacing mercury as a fluid or to varying the dynamic response of a single isolator to attenuate differing vibration modes. An example of the latter is found in commonly assigned U.S. Pat. No. 5,439,082, titled "Hydraulic Inertial Vibration Isolator," issued 8 Aug. 1995, to McKeown, et al. (McKeown '082). McKeown '082 is incorporated herein by reference.

Several factors affect the performance and characteristics of the Halwes-type isolator, including the density and viscosity of the fluid employed, the relative dimensions of components of the isolator, and the like. One improvement in the design of such isolators is disclosed in commonly assigned U.S. Pat. No. 6,009,983, titled "Method and Apparatus for Improved Isolation," issued 4 Jan. 2000, to Stamps et al. (Stamps '983). In Stamps '983, a compound radius at the each end of the tuning passage was employed to provide a marked improvement in the performance of the isolator. Stamps '983 is incorporated herein by reference.

Another area of improvement in the design of the Halwes-type isolator has been in an effort directed toward a means for changing the isolator's frequency in order to increase the isolator's effectiveness during operation. One development in the design of such isolators is disclosed in commonly assigned U.S. Pat. No. 5,435,531, titled "Vibration Isolation System," issued 25 Jul. 1995, to Smith et al. (Smith '531). In Smith '531, an axially extendable sleeve is used in the inner wall of the tuning passage in order to change the length of the tuning passage, thereby changing the isolation frequency. Another development in the design of tunable Halwes-type isolators was disclosed in commonly assigned U.S. Pat. No. 5,704,596, titled "Vibration Isolation System," issued 6 Jan. 1998, to Smith et al. (Smith '596). In Smith '596, a sleeve is used in the inner wall of the tuning passage in order to change the cross sectional area of the tuning passage itself, thereby changing the isolation frequency during operation. Both Smith '531 and Smith '596 were notable attempts to actively tune the isolator.

Another development in the area of vibration isolation is the tunable vibration isolator disclosed in U.S. Pat. No. 6,695,106, titled "Method and Apparatus for Improved Vibration Isolation," issued 24 Feb. 2004, to Smith et al, which is hereby incorporated by reference.

Referring to FIGS. 1 and 2, in FIG. 1, a perspective view of isolator 101 is illustrated. FIG. 2 is a cross-sectional view of isolator 101 taken along section lines II-II in FIG. 1. Isolator 101 has an upper housing 113, a lower housing 115, a piston 117, a reservoir 109, and a sight glass 111. Reservoir 109 is a volume for containing tuning fluid 105 and gas 103. Valve 107 is used to pressurize reservoir 109, as well as to test the pressure within reservoir 109. In order for isolator 101 to operate effectively without fluid cavitation over the entire operating temperature range, reservoir 109 must remain pressurized.

One shortcoming of isolator 101 is the difficulty to keep reservoir 109 pressurized during operation and maintenance procedures. Because the volume of reservoir 109 is so small, a slight pressure leak can cause reservoir 109 to quickly lose pressure, thereby causing isolator 101 to lose effectiveness. During maintenance the pressure within reservoir 109 can be checked through valve 107, which may also cause a slight leakage of gas 103, thereby causing the pressure within reservoir 109 to decrease substantially.

Although the foregoing developments represent great strides in the area of vibration isolation, many shortcomings remain.

BRIEF DESCRIPTION OF THE DRAWINGS

The novel features believed characteristic of the application are set forth in the appended claims. However, the application itself, as well as, a preferred mode of use, and further objectives and advantages thereof, will best be understood by reference to the following detailed description when read in conjunction with the accompanying drawings, wherein:

DESCRIPTION OF THE PREFERRED EMBODIMENT

Figure 3:
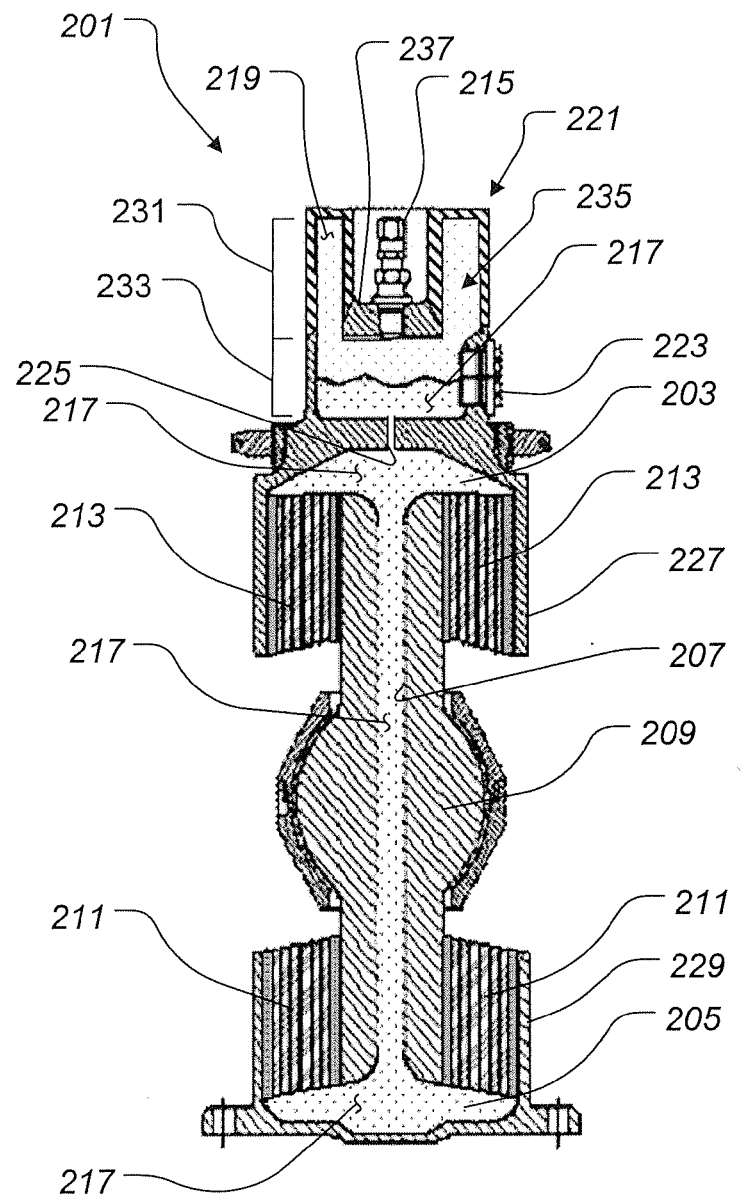
FIG. 3 is a cross-sectional view of a vibration eliminator according to the preferred embodiment of the present application.

Referring to FIG. 3 in the drawings, a cross-sectional view of a vibration isolator 201, according to the preferred embodiment of the present application, is illustrated. Vibration isolator 201 comprises an upper housing 227 and a lower housing 229. A piston 209 is at least partially disposed within the interior of upper housing 227 and lower housing 229. Piston 209 is typically coupled to a vibrating body, such as a transmission of an aircraft (not shown). Lower housing 229 is typically coupled to a body to be isolated from vibration, such as a roof structure (not shown) of an aircraft. In such an arrangement, the aircraft structure serves as the body to be isolated from vibration, and the transmission of the aircraft serves as the vibrating body. An upper elastomeric member 213 seals and resiliently locates piston 209 within the interior of upper housing 227. Similarly, a lower elastomeric member 211 seals and resiliently locates piston 209 within the interior of lower housing 229. Elastomeric members 211 and 213 function at least as a spring to permit piston 209 to move or oscillate relative to housings 227 and 229. When no load is applied, elastomeric members 211 and 213 are configured to locate piston 209 generally central to upper housing 227 and lower housing 229. The interior of piston 209 defines a generally elongated tuning passage 207. An upper fluid chamber 203 is generally defined by the interior of upper housing 227, piston 209, and upper elastomeric member 213. Similarly, a lower fluid chamber 205 is generally defined by the interior of lower housing 229, piston 209, and lower elastomeric member 211.

Tuning passage 207 extends centrally through a longitudinal axis of piston 209, so that upper fluid chamber 203 and lower fluid chamber 205 are in fluid communication. A tuning fluid 217 is disposed in upper fluid chamber 203, lower fluid chamber 205, and tuning passage 207. Tuning fluid 217 preferably has low viscosity, relatively high density, and non-corrosive properties.

Introduction of an axial force into piston 209 translates piston 209 axially relative to upper housing 227 and lower housing 229. The movement of piston 209 forces tuning fluid 217 to move through tuning passage 207 in a direction opposite to the translation direction of piston 209. Movement of tuning fluid 217 produces an inertial force that cancels, or isolates, the force from piston 209 at a discrete frequency, i.e., isolation frequency.

An accumulator assembly 221 is integral to upper housing 227, and functions at least to provide fluid 217, under pressure, to upper fluid chamber 203, lower fluid chamber 205, and tuning passage 207. Reservoir 235 is formed from the interior volume of accumulator assembly 221. Reservoir 235 is comprised of an expanded accumulator region 231 and a lower region 233. Passage 225 provides a means of fluid communication between reservoir 235 and upper fluid chamber 203. Accumulator assembly 221 includes a valve 215 for introducing gas 219 into reservoir 235.

In order for isolator 201 to function as desired, fluid 217 and gas 219 within reservoir 235 should be pressurized, for example to approximately 100 psi (pounds per square inch). During operation of isolator 201, leakage of either gas 219 or fluid 217 may occur; such a leakage results in a decrease in the pressure of gas 219 and fluid 217 within isolator 201. If the pressure of gas 219 and fluid 217 substantially decreases, operation of isolator 201 likely results in some of fluid 217 vaporizing into a gas, otherwise known as cavitation of fluid 217, which results a degradation in isolator 201 performance. In addition, during maintenance of isolator 201, a measurement of the pressure within isolator 201 is taken from valve 215. Valve 215 is preferably a two-way valve, such as a Schrader valve; however, it should be appreciated that valve 215 may also be other types of valves, such as a one-way valve. The acquisition of a conventional pressure measurement from valve 215 results in a portion of gas 219 exiting through valve 215, thus resulting in a pressure loss. However, expanded accumulator region 231 of reservoir 235 provides supplemental gas volume within reservoir 235. Expanded accumulator region 231 decreases the sensitivity of isolator 201 to gas or fluid leaks, as well as to pressure leaks sustained during maintenance pressure checks. Expanded accumulator region 231 preferably is configured as a cylindrical volume with an interior cylindrical depression 237. It should be appreciated that it is fully contemplated that expanded accumulator region 231 can be a variety of geometric shapes. Interior depression 237 within expanded accumulator region 231 provides a protective area for valve 215 so as to minimize damage to valve 215 from maintenance personnel and operational hazards. It should be appreciated that even though expanded accumulator region 231 is depicted as being in open fluid communication with reservoir 235, one or more elements such as pipes, tubes, cylinders, and the like can be used provide fluid communication between expanded accumulator region 231 and reservoir 235. Because expanded accumulator region 231 provides a supplemental volume for gas 219, in addition to lower region 233, the risk of severe pressure loss within isolator 201 is mitigated. In the preferred embodiment, gas 219 is nitrogen, but gas 219 may also be other gas elements and mixtures, such as air. A sight glass 223 is configured to facilitate visually inspection of the amount of fluid 217 within accumulator assembly 221.

Figure 4:
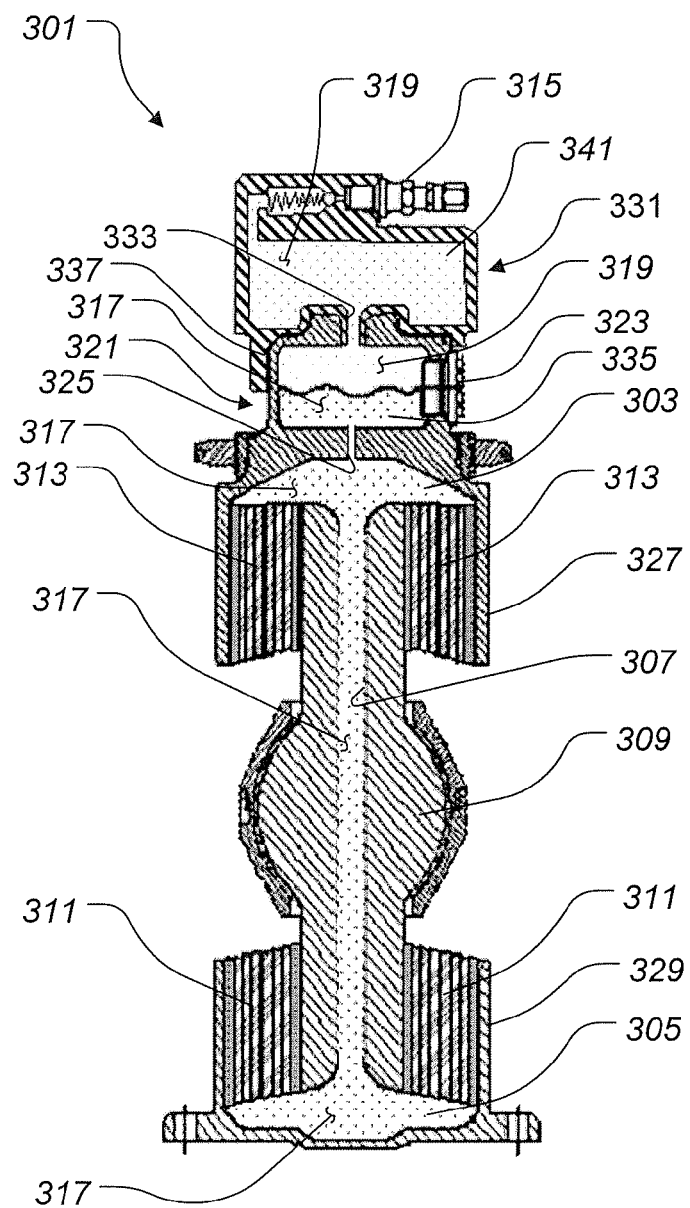
FIG. 4 is a cross-sectional view of a vibration eliminator according to an alternative embodiment of the present application.

Referring now to FIG. 4 in the drawings, a cross-sectional view of an alternative embodiment of a vibration eliminator 301 is illustrated. Vibration isolator 301 comprises an upper housing 327 and a lower housing 329. A piston 309 is at least partially disposed within the interior of upper housing 327 and lower housing 329. Piston 309 is typically coupled to a vibrating body, such as a transmission of an aircraft (not shown). Lower housing 329 is typically coupled to a body to be isolated from vibration, such as a roof structure (not shown) of an aircraft. In such an arrangement, the aircraft structure serves as the body to be isolated from vibration, and the transmission of the aircraft serves as the vibrating body. An upper elastomeric member 313 seals and resiliently locates piston 309 within the interior of upper housing 327. Similarly, a lower elastomeric member 311 seals and resiliently locates piston 309 within the interior of lower housing 329. Elastomeric members 311 and 313 function at least as a spring to permit piston 309 to move or oscillate relative to housings 327 and 329. When no load is applied, elastomeric members 311 and 313 are configured to locate piston 309 generally central to upper housing 327 and lower housing 329. The interior of piston 309 defines a generally elongated tuning passage 307. An upper fluid chamber 303 is generally defined by the interior of upper housing 327, piston 309, and upper elastomeric member 313. Similarly, a lower fluid chamber 305 is generally defined by the interior of lower housing 329, piston 309, and lower elastomeric member 311.

Tuning passage 307 extends centrally through a longitudinal axis of piston 309, so that upper fluid chamber 303 and lower fluid chamber 305 are in fluid communication. A tuning fluid 317 is disposed in upper fluid chamber 303, lower fluid chamber 305, and tuning passage 307. Tuning fluid 317 preferably has low viscosity, relatively high density, and non-corrosive properties.

Introduction of an axial force into piston 309 translates piston 309 axially relative to upper housing 327 and lower housing 329. The movement of piston 309 forces tuning fluid 317 to move through tuning passage 307 in a direction opposite to the translation direction of piston 309. Movement of tuning fluid 317 produces an inertial force that cancels, or isolates, the force from piston 309 at a discrete frequency, i.e., isolation frequency.

An accumulator assembly 321 is integral to upper housing 327, and comprises a reservoir 335 and a sight glass 323. Reservoir 335 is formed from the interior volume of accumulator assembly 321. Reservoir 335 functions at least to provide fluid 317, under pressure, to upper fluid chamber 303, lower fluid chamber 305, and tuning passage 307. Passage 325 provides a means of fluid communication between accumulator assembly 321 and upper fluid chamber 303. In order for isolator 301 to function as desired, fluid 317 and gas 319 within reservoir 335 should be pressurized, for example, to approximately 100 psi.

A partitioned accumulator 331 is coupled to accumulator assembly 321 in order to provide supplemental volume for gas 319. Partitioned accumulator 331 is preferably bonded to accumulator assembly 321 with adhesive 337. It should be appreciated that partitioned accumulator 331 can be coupled to accumulator assembly 321 using means other than adhesive bonding; such as, welding, mechanical coupling, or any combination thereof, to name a few. It should be appreciated that the coupling of partitioned accumulator 331 to accumulator assembly 321 may involve at least a mechanical fastener and an associated seal, the seal being configured to aid in leakage prevention. A partitioned chamber 341 is formed from the interior volume of partitioned accumulator 331. Partitioned chamber 341 is placed in fluid communication with reservoir 335 through an accumulator passage 333. It should be appreciated that even though accumulator passage 333 is depicted as being an open physical channel, one or more elements such as pipes, tubes, cylinders, and the like can be used provide fluid communication between partitioned chamber 341 and reservoir 335.

During operation of isolator 301, leakage of either gas 319 or fluid 317 may occur; such a leakage results in a decrease in the pressure of gas 319 and fluid 317 within isolator 301. If the pressure of gas 319 and fluid 317 substantially decreases, operation of isolator 301 likely results in some of fluid 317 vaporizing into a gas, otherwise known as cavitation of fluid 317, thus resulting in a degradation of isolator 301 performance. In the current embodiment, valve 315 is preferably a one-way valve; however, it is should be appreciated that valve 315 may also be other types of valves, such as a two-way valve. Because valve 315 is preferably a one-way valve, gas 319 is not able to escape through valve 315, but gas 319 can be introduced into partitioned accumulator 331 through valve 315. As such, during maintenance operations, valve 315 is not configured to provide a pressure measurement, but maintenance personnel can introduce gas at a desired pressure until gas no longer flows through valve 315, meaning that the internal pressure is at the desired pressure.

Partitioned chamber 341 within partitioned accumulator 331 provides supplemental gas volume for accumulator assembly 321. Partitioned chamber 341 decreases the sensitivity of isolator 301 to gas 319 or fluid 317 leaks, as well as to possible gas 319 leaks sustained during maintenance pressure checks. Because Partitioned chamber 341 provides a substantial increase in volume to be filled with gas 319, the leakage of a certain amount of gas 319 or fluid 317 does not cause a substantial decrease in pressure. It is preferred that gas 319 is nitrogen, but gas 319 may also be other gas elements and mixtures, such as air. Sight glass 323 is configured to facilitate visually inspection of the amount of fluid 317 within reservoir 335.

Figure 1:
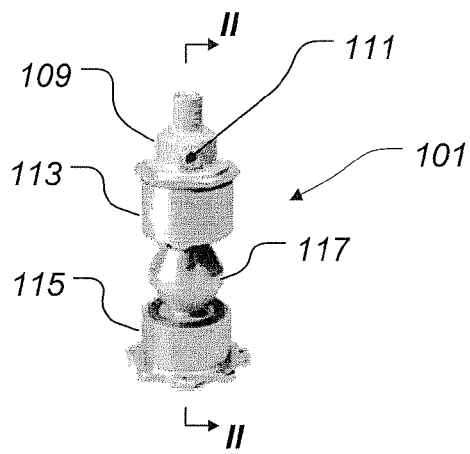
FIG. 1 is a perspective view of a prior art vibration isolator.
Figure 2:
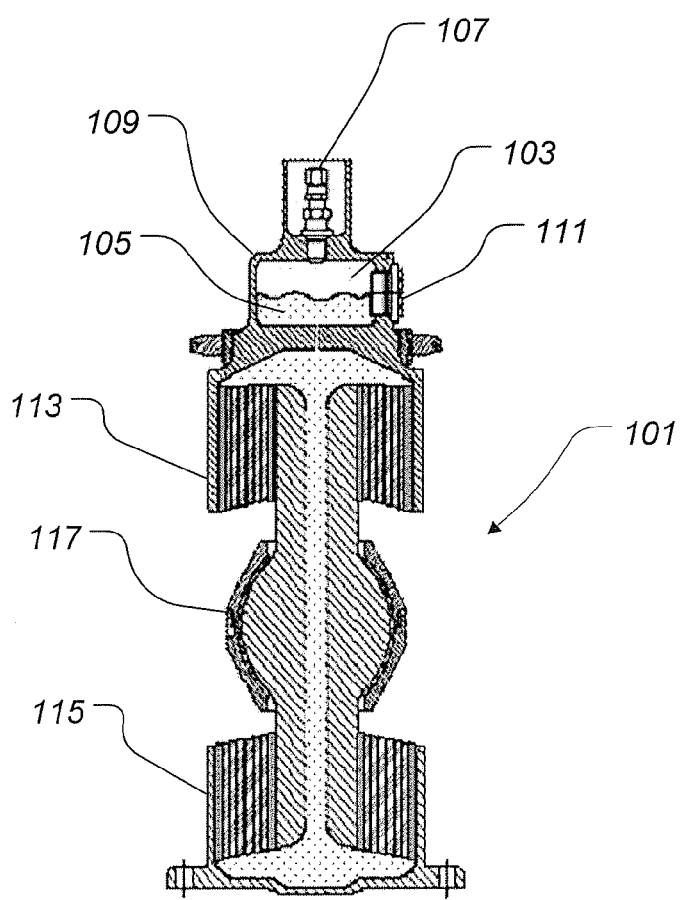
FIG. 2 is a cross-sectional view of the prior art vibration isolator taken from section lines II-II, shown in FIG. 1.

It should be appreciated that partitioned accumulator 331 is configured to be field retrofitable upon isolator 101, shown in FIGS. 1 and 2. In general, retrofitting isolator 101 into isolator 301 would involve removal of valve 107 and machining away the valve protector around valve 107. Subsequently, partitioned accumulator 331 can be coupled to reservoir 109 with adhesive 339, or other appropriate means noted herein.

It is apparent that an application with significant advantages has been described and illustrated. Although the present application is shown in a limited number of forms, it is not limited to just these forms, but is amenable to various changes and modifications without departing from the spirit thereof.

The invention claimed is:

1. A vibration isolator, comprising:
 an upper housing defining an upper fluid chamber;
 a lower housing defining a lower fluid chamber;
 a piston resiliently disposed within the upper housing and the lower housing;
 a tuning passage defined by the piston for providing fluid communication between the upper fluid chamber and the lower fluid chamber;
 a tuning fluid disposed within the tuning passage, the upper fluid chamber, and the lower fluid chamber;
 an accumulator assembly integrally extending from the upper housing, the accumulator assembly comprising:
  a reservoir defined by the interior volume of the accumulator assembly, the reservoir comprising:
   a lower region containing a gas and the tuning fluid;
   an expanded accumulator region providing supplemental volume for the gas; and a partition at least partially defining the lower region, the expanded accumulator, and an accumulator passage;

wherein the accumulator passage provides fluid communication between the lower region and the expanded accumulator region, and wherein the expanded accumulator is separated from the upper fluid chamber by the partition and the lower region; and an external valve configured for facilitating the introduction of the gas into the reservoir, the external valve being at least partially surrounded by the expanded accumulator region; and a passage for providing fluid communication between the lower region of the reservoir and the upper fluid chamber.

2. The vibration isolator according to claim 1, wherein the gas comprises nitrogen.

3. The vibration isolator according to claim 1, wherein the accumulator assembly further comprises a sight glass for visually checking the amount of the fluid in the vibration isolator.

4. The vibration isolator according to claim 1, wherein the valve is a two-way valve for selectively adding and removing the gas from the reservoir.

5. The vibration isolator according to claim 1, wherein the valve is a one-way valve.

6. The vibration isolator according to claim 1, wherein the fluid and the gas are pressurized to approximately 100 psi.

7. A vibration isolator, comprising:
an upper housing defining an upper fluid chamber;
a lower housing defining a lower fluid chamber;
a piston resiliently disposed within the upper housing and the lower housing;
a tuning passage defined by the piston for providing fluid communication between the upper fluid chamber and the lower fluid chamber;
a tuning fluid disposed within the tuning passage, the upper fluid chamber, and the lower fluid chamber;
an accumulator assembly integrally extending from the upper housing, the accumulator assembly comprising a reservoir defined by an interior volume of the accumulator assembly, the reservoir being in fluid communication with the upper fluid chamber;
a partitioned accumulator coupled to the accumulator assembly, the partitioned accumulator comprising a partitioned chamber filled with a gas, the partitioned chamber configured to be in fluid communication with the reservoir;
a passage for providing fluid communication between the reservoir and the upper fluid chamber; and
an accumulator passage for providing fluid communication between the partitioned chamber and the reservoir;
wherein the reservoir is fluidly disposed between the partitioned chamber and the upper fluid chamber such that fluid within the partitioned chamber is isolated from the upper fluid chamber unless the fluid travels through the reservoir.

8. The vibration isolator according to claim 7, wherein the gas comprises nitrogen.

9. The vibration isolator according to claim 7, wherein the accumulator assembly further comprises a sight glass for visually checking the amount of the fluid in the reservoir.

10. The vibration isolator according to claim 7, wherein the partitioned accumulator further comprises a valve for selectively controlling pressure of the gas in the reservoir and the partitioned chamber.

11. The vibration isolator according to claim 10, wherein the valve is a one-way valve.

12. The vibration isolator according to claim 10, wherein the valve is a two-way valve.

13. The vibration isolator according to claim 7, wherein the fluid and the gas are pressurized to approximately 100 psi.

14. A partitioned accumulator configured to be retrofitable onto a vibration isolator, the vibration isolator having an upper housing, a lower housing, a piston resiliently disposed within the upper housing and the lower housing, a tuning passage defined by the piston and extending along a longitudinal axis of the piston, a tuning fluid disposed within the tuning passage, an accumulator assembly integrally extending from the upper housing, a reservoir defined by an interior of the accumulator assembly, the partitioned accumulator comprising:
a partitioned chamber configured to provide a volume for a gas;
an accumulator passage for providing fluid communication between the partitioned chamber and the reservoir; and
a valve for selectively controlling the pressure within the partitioned chamber;
wherein the partitioned accumulator is configured to be coupled to the accumulator assembly such that the partitioned chamber lies along the longitudinal axis of the piston.

15. The partitioned accumulator according to claim 14, wherein the valve is a one-way valve.

16. The partitioned accumulator according to claim 14, wherein the partitioned accumulator is coupled to the accumulator assembly with an adhesive.

17. The partitioned accumulator according to claim 14, wherein the partitioned accumulator is coupled to the accumulator assembly as a result of a welding process.

18. The partitioned accumulator according to claim 14, wherein the partitioned accumulator is coupled to the accumulator assembly with at least one mechanical fastener.

* * * * *